United States Patent [19]

Bleimhofer et al.

[11] Patent Number: 4,899,465
[45] Date of Patent: Feb. 13, 1990

[54] WATERPROOF FOOTWEAR

[75] Inventors: Walter Bleimhofer, Penzberg; Thorger Hübner, Kolbermoor, both of Fed. Rep. of Germany

[73] Assignee: W. L. Gore & Associates, Inc., Newark, Del.

[21] Appl. No.: 216,928

[22] Filed: Jul. 8, 1988

[30] Foreign Application Priority Data

Jul. 8, 1987 [DE] Fed. Rep. of Germany ....... 3722589

[51] Int. Cl.$^4$ ............................................. A43C 13/08
[52] U.S. Cl. ........................................... 36/14; 36/12; 36/55
[58] Field of Search ................... 36/DIG. 2, 4, 12, 14, 36/32 R, 43, 55, 103; 264/244, 273

[56] References Cited

U.S. PATENT DOCUMENTS

| | | | |
|---|---|---|---|
| 3,175,308 | 3/1965 | Werman | 36/14 |
| 3,365,821 | 1/1968 | Cottier | 36/4 |
| 4,523,346 | 6/1985 | Auberry | 264/244 |
| 4,819,345 | 4/1989 | Mulcahy | 36/12 |

FOREIGN PATENT DOCUMENTS

| | | | |
|---|---|---|---|
| 963308 | 4/1957 | Fed. Rep. of Germany | 36/14 |
| 147453 | 4/1981 | Fed. Rep. of Germany | 36/14 |
| 1104145 | 6/1955 | France | 36/14 |
| 483967 | 8/1953 | Italy | 36/14 |
| 244404 | 5/1964 | Netherlands | 36/14 |
| 100182 | 5/1962 | Norway | 264/244 |
| 354000 | 6/1961 | Switzerland | 264/244 |
| 899477 | 6/1962 | United Kingdom | 264/244 |

Primary Examiner—Werner H. Schroeder
Assistant Examiner—Diana L. Biefeld

[57] ABSTRACT

Footwear consisting of an insole, an upper sewn to the insole, a lining for lining the upper which is also sewn to the insole and has microporous functional layer that is waterproof and permeable to water vapor, and a waterproof plastic sole which is injection-molded to the bottom side of the insole and the lower portion of the upper and encloses the seam region. The lower portion of the upper which is adjacent to the insole is formed by a porous material that is adapted to be penetrated by the plastic sole material which is liquid during the injection molding operation.

20 Claims, 2 Drawing Sheets

WATERPROOF FOOTWEAR

FIELD OF THE INVENTION

This invention relates to improved footwear having an insole, an upper, a lining that lines the upper and sewn to the insole and which has a microporous functional layer that is waterproof and permeable to water vapor and a plastic sole that is injection molded to the bottom of the insole, the footwear further providing that the lower portion of the upper adjacent to the insole be formed of a porous material adapted to be penetrated by the plastic sole material that is liquid during injection molding. The invention also provides a method for making the improved footwear.

BACKGROUND OF THE INVENTION

Microporous membrane materials which are waterproof but permeable to water vapor have been used increasingly for the manufacture of clothing articles over the past few years. In view of the vapor-permeability thereof, one obtains pleasant wearing properties. Such membrane material consists for example of porous polytetrafluoroethylene (hereinafter PTFE).

In more recent times, such membrane material has also been used for the manufacture of waterproof footwear. In this respect, the upper is lined at least on the inside with such membrane material which is preferably designated as a functional layer, U.S. Pat. No. 4,599,810 describes such a footwear article.

Problems arise at the seams in the location where the shoe upper is sewn to the insole. At the stitch locations, the functional layer is perforated and becomes permeable to water.

To overcome this problem, sock-like inserts and inner linings have been employed between the upper and the insole. This sock-like insert may acquire a given shape by welding and thus it need not have seam holes. However, this method involves a high manufacturing expenditure to adapt the sock-like inserts to the particular shoe form.

Another known method is the use of injection-molded rubber or plastic, which in general forms the outer sole around the bottom side of the insole and the lower portion of the upper that is lined with the functional layer and sewn to the insole. In doing so, the connecting seam between the insole and the upper is enclosed by the rubber or plastic sole, i.e. by waterproof material.

Further, the upper usually consists of leather or a textile fabric, made, for example from synthetic fibers.

The molded-on plastic sole provides a seal for the seam between the insole and the upper lined with the functional layer against direct impingement of water. However, the upper materials mentioned particularly leather, direct water in the longitudinal extension thereof. This directing of water involves capillary action. Thus, when the upper portion that is not covered by the plastic sole becomes wet, the water creeps along the upper due to this longitudinal directing effect, and passes to the seam located within the molded-on plastics sole, where the water may then penetrate the functional layer at the seam holes. The functional layer is usually located within a laminate, coated with a protective textile material on the side facing the upper and with a lining material on the side facing the inside. This lining material usually is absorbent and water-conductive. The water that enters along the upper and penetrates through the seam then creeps along the lining into the interior of the shoe. Measurements show that it takes about 10 minutes after the footwear has become wet on the outside for the inner lining to become wet.

SUMMARY OF THE INVENTION

A footwear article is provided which includes an insole, an upper sewn to the insole, a lining for lining the upper which is also sewn to the insole and which has a microporous functional layer that is waterproof and permeable to water vapor, and a waterproof plastic sole which is injection-molded to the bottom side of the insole and the lower portion of the upper and encloses the seam region. The lower portion of the upper which is adjacent to the insole is formed of a porous material that is adapted to be penetrated by the plastic sole material which is liquid during the injection molding operation.

DETAILED DESCRIPTION OF THE PREFERRED EMBODIMENTS

Figure 1:
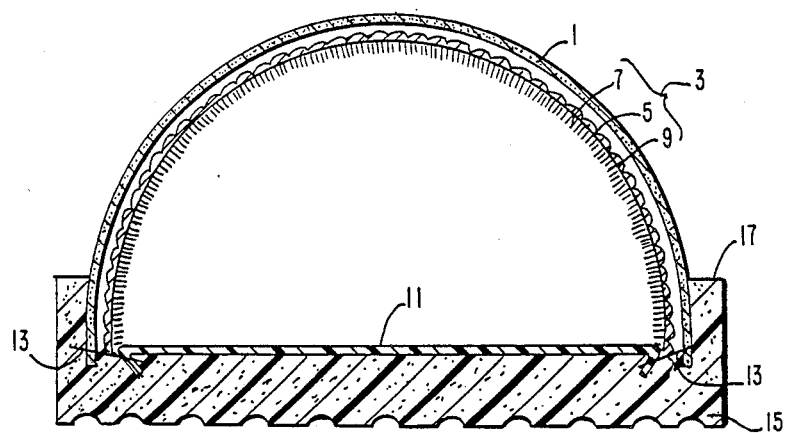
FIG. 1 shows an end view of a shoe made using existing technology.

This invention provides for improved footwear having an insole, an upper lined with a lining that attaches to the insole and a plastic sole that is injection molded to the bottom of an insole. The lining has a microporous functional layer such as porous polytetrafluoroethylene (PTFE) that is waterproof and permeable to water vapor. Further, the lower portion of the upper, adjacent to the insole, comprises a perforated, porous, and mesh-like material so that the liquid material of the plastic sole, when injection-molded to the insole and the upper can penetrate through the lower portion of the upper to the functional layer of the lining. The molded-on plastic sole material seals the seam holes of the connecting seam between the insole, the functional layer and the upper.

In a preferred embodiment, a spacer is disposed between the functional layer of the lining and the lower portion of the upper, the spacer being of good permeability for the liquid plastic sole material. Thus, the impermeable upper portion is prevented from covering seam holes and thereby allows the liquids plastic sole material to contact the seam holes. The injection molding operation of the plastic sole requires pressures in the ranges of 5 atms so that the upper material is pressed against the functional layer of the lining under relatively high pressure.

The lower portion of the upper material may be perforated in the area adjacent to the insole and the seam. Alternatively, the upper may terminate above the insole connection seam and the distance between the lower end of the upper and the insole seam region may be bridged with a porous material. In doing so, the porous material may have one end sewn to the lower end of the upper material, without being sewn to the functional layer. At the other end, the porous material is sewn to the insole together with the functional layer.

In this latter case, the porous material is designed as a spacer, and may be in the form of a plastic fiber network with mesh apertures being at least in the range of 1.5 mm. If the fiber network does not have sufficient stiffness, it may be provided with an adhesive and may be made sufficiently stiff.

The porous upper portion may extend beyond the top edge of the molded plastic sole, so that either the upper material may be perforated up to this height, or the porous material connecting the lower end of the upper to the insole may extend beyond the top edge of the plastic sole. A drainage function is thereby obtained. When water enters in the top portion of the upper between the upper and the functional layer, (e.g. in the case where the person wearing the footwear walks through water) water can drain off via the porous upper portion located above the plastic sole.

It is also possible to perforate a portion of the plastic sole that is located above the seam between insole and functional layer and preferably extends as far as the sole top edge, in order to obtain water draining in this sole region. The advantage in this is that drainage can be effected up to an area located closely above the seam joining insole and functional layer, which is sealed to the sole material.

In addition, the upper material and plastic sole perforating in the region above the seam joining insole and functional layer may both be perforated. This leads to optimum drainage for water that has penetrated the upper material and passed between the upper and functional layer.

The effect achieved by using a spacer between the lower portion of the upper and the functional layer is that the material of the plastic sole rises to a sufficient height in the space between the upper and the functional layer and rises as far as beyond the top edge of the injection-molded plastics sole. It therefore excludes possible tear channels in the material of the plastics sole from humidity draining channels extending as far as the seam.

The invention is best understood by reference to the accompanying figures.

FIG. 1 shows a shoe made using existing technology and comprises an upper 1 consisting of leather, textile fabric, and a plastic material. The inside of the upper 1 is lined with a laminate 3 functioning as an inner lining, and comprises a functional layer or membrane 5 which is waterproof and permeable to water vapor and which is lined with a textile 7 on the side facing the upper 1 and with lining material 9 on the side facing the interior of the shoe. A preferred membrane that is waterproof and permeable to water vapor is porous PTFE. The lining material 9 and the textile fabric 7 form a mechanical protection for the functional layer 5. The composite arrangement of upper 1 and laminate 3 is sewn at its lower end to the edge of an insole 11, and the seam is designated 13. A sole 15 of any suitable waterproof plastic material is injection-molded to the bottom side of the insole 11 and to the lower portion of the upper 1 sewn thereto. The top edge 17 of the sole 15 is located at such a height that the seam 13 is enclosed by the sole 15. The seam 13 is thus sealed against directly impinging water.

However, water impinging on the portion of the upper 1 that is located outside of the sole 15 may pass along the upper on the inside of the sole 15 and can reach the seam, where it can penetrate the seam or stitch holes in the functional layer 5 and enter into the interior space of the shoe.

Figure 2:
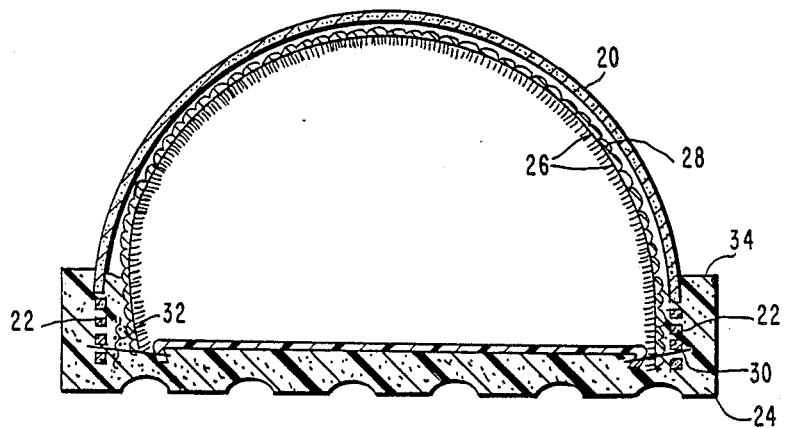
FIG. 2 shows a shoe according to one embodiment of the present invention.

In one embodiment of the present invention shown in FIG. 2, the upper 20 has a porous portion 22 in the connecting region with the insole. During injection molding of the sole 24, liquid caoutchouc or plastic material passes through the openings of the porous portion 22 of the upper 20 onto the laminate. The plastic sole material which is then present between the laminate 26 and the upper 20 seals the seam holes in the functional layer 28. Water passing in the upper material down to the seam 30 cannot penetrate the seam holes, which are sealed with the plastic sole material. Thus, no water can enter into the interior of the shoe.

The left-hand side of FIG. 2 shows a modified embodiment in which a perforated or porous spacer 32 is inserted between the perforated portion 22 of the upper 20 and the laminate 26. This spacer 32 keeps the laminate 26 and the porous portion 22 spaced from each other and is adapted to be penetrated by liquid plastic sole material during injection molding of the sole 24. Due to the spacer 32, more plastic sole material can flow into the space between the upper and the laminate. Furthermore, when the spacer 32 is used, the injection-molded plastics material may rise to a higher level between upper 20 and laminate 26 than it would be possible without the spacer 32. In view of the high injection molding pressure during molding-on of the sole 24, the sealing lip of the injection mold must be pressed against the upper with a correspondingly high pressure in the region of the top edge 34 of the sole 24. Without the spacer 32, only a correspondingly lesser amount of plastic material could pass between the upper 20 and the laminate 26. More material in this space increases the possibility that tear channels in the plastics material will not become humidity channels.

The spacer 32 may extend beyond the top edge 34 of the sole 24. It is even possible to line the entire upper 20 with the spacer, which may give the shoe more overall stability and render possible simple manufacturing operations.

Preferred material for the sole 24 are polyurethane (PU), polyvinyl chloride (PVC) and transparent caoutchouc (TR).

It is possible to use a net material for the spacer 32 which can be sewn on the one hand and is permeable for the liquid plastics sole material during injection molding on the other hand. A preferred material is synthetic fiber material in net form with a mesh size of preferably at least approximately 1.5 mm. The spacer 32 should preferably consist of monofil material in order to avoid fibrillary channels which are water-conductive and cannot be sealed by the plastics material during injection molding., such channels arise in multifilament material. Suitable plastics materials are for example polyamide and polyester. The material of the spacer 32 can be coated with adhesive so as to increase the stiffness and stability thereof.

Figure 3:
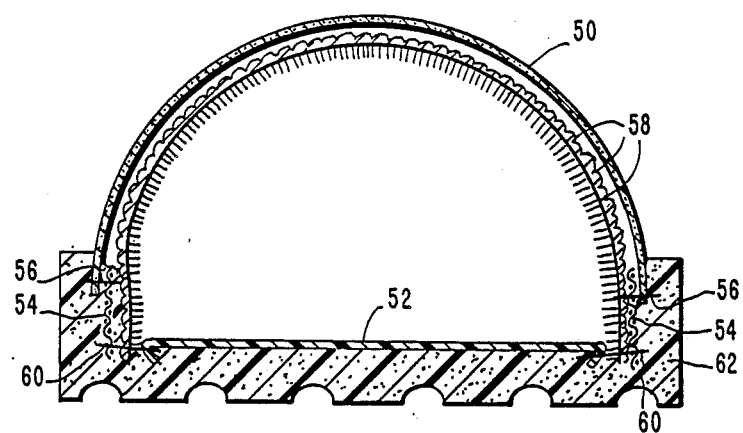
FIG. 3 shows a shoe according to an alternative embodiment of the present invention.

In the embodiment of the invention shown in FIG. 3, the upper 50 does not extend down to the insole 52 but the lower end of the upper is spaced from the insole edge. This space is bridged by a perforated or porous connecting material 54 which may be the same material as the spacer 32 in FIG. 2. The top edge of the connecting material 54 is sewn to the lower edge of the upper 20, at a seam 56. However, the laminate 58 is not sewn to the upper at this location. The other end of the connecting material 54 is sewn to the insole 52 together with the lower end of the laminate 58, at a seam 60.

During molding-on of the sole 62, liquid sole material passes through the pores or holes or meshes of the connecting material 54 onto the outside of the laminate 58, whereby the seam holes of the seam 60 are sealed by the plastics sole material.

While the invention has been disclosed herein in connection with certain embodiments and detailed descriptions, it will be clear to one skilled in the art that modifications or variations of such details can be made without deviating from the gist of this invention and such modifications or variations are considered to be within the scope of the claims hereinbelow.

What is claimed is:

1. Footwear comprising an insole having a bottom side, an upper having lower and upper portions, said lower portion sewn to the insole forming connecting seams, a lining that lines the upper and is also sewn to the insole at a connecting seam and has a microporous functional layer which is waterproof and permeable to water vapor, and a plastic sole which is injection-molded to the bottom side of the insole and the lower portion of the upper, and encloses the connecting seams, characterized in that at least the lower portion of the upper which is adjacent the insole is formed by porous material adapted to be penetrated by the plastic sole which is liquid during injection molding.

2. Footwear according to claim 1, characterized in that, at least in the region of a connecting seam between the upper and the insole, a porous spacer is secured between the upper and the lining said spacer being adapted to be penetrated by the plastics sole material which is liquid during the injection molding operation.

3. Footwear according to claim 2, characterized in that the spacer is secured by a connecting seam joining the upper, insole, and lining.

4. Footwear according to claim 1 characterized in that the porous material is formed by upper material that has been perforated.

5. Footwear according to claim 1 characterized in that the upper terminates above the insole and connecting seam creating a gap, and wherein the gap between the upper and insole is bridged with a porous connecting material having two ends adapted to be penetrated by the plastic sole material, said porous connecting material being sewn on one end to the upper, but not to the lining and being sewn on the other end to the insole.

6. Footwear according to claim 5, characterized in that the porous connecting material is additionally designed as a spacer.

7. Footwear according to claim 1 characterized in that the porous material of the upper extends from the insole beyond the plastic sole.

8. Footwear according to claim 1 characterized in that the plastic sole is permeable to water vapor.

9. Footwear according to claim 1, characterized in that the material of the plastic sole is selected from the group comprising polyurethane, transparent caoutchouc, and polyvinylchloride.

10. Footwear according to claim 1 characterized in that the lining is formed by a laminate comprising a microporus functional layer having interior and exterior faces, the layer which is waterproof and permeable to water vapor, the exterior face adjacent the upper further provided with a mechanically protecting textile layer and the interior face being provided with a mechanically protecting, selectively warming, lining layer.

11. Footwear according to claims 1 or 10 characterized in that the functional layer consists of a membrane of porous polytetrafluorethylene.

12. Footwear according to claim 1 characterized in that the upper consists of a textile fabric.

13. Footwear according to claim 1 characterized in that the upper consists of leather.

14. Footwear according to claim 1 characterized in that the porous material comprising the lower portion of the upper and adjacent the insole is a synthetic fiber net.

15. Footwear according to claim 14 wherein the synthetic fiber net has a mesh aperature, the size of which is in the range of approximately 1.5 mm.

16. Footwear according to claim 14 characterized in that the material of the synthetic fiber net is selected from the group comprising polyamide and polyester.

17. Footwear according to claim 14 characterized in that the synthetic fiber net is provided with an adhesive to stiffen the net.

18. Footwear according to claim 1 where the plastic sole is a breathable polymeric material.

19. Footwear according to claim 18 where the plastic sole is a composite polymeric material rendered breathable.

20. A method of making footwear having an upper lined with a microporous functional layer that is waterproof and permeable to water vapor in which the lining extends beyond the upper to form a connecting region and an insole comprising the steps of:
sewing the connecting region of the upper and lining to the insole thereby forming a seam; and
injection molding a plastic sole to the insole in a manner that encloses the seam and a lower portion of the upper wherein the plastic sole is in liquid form during injection-molding and whereby the liquid plastic penetrates the connecting region.

* * * * *